United States Patent Office 3,070,333
Patented Dec. 25, 1962

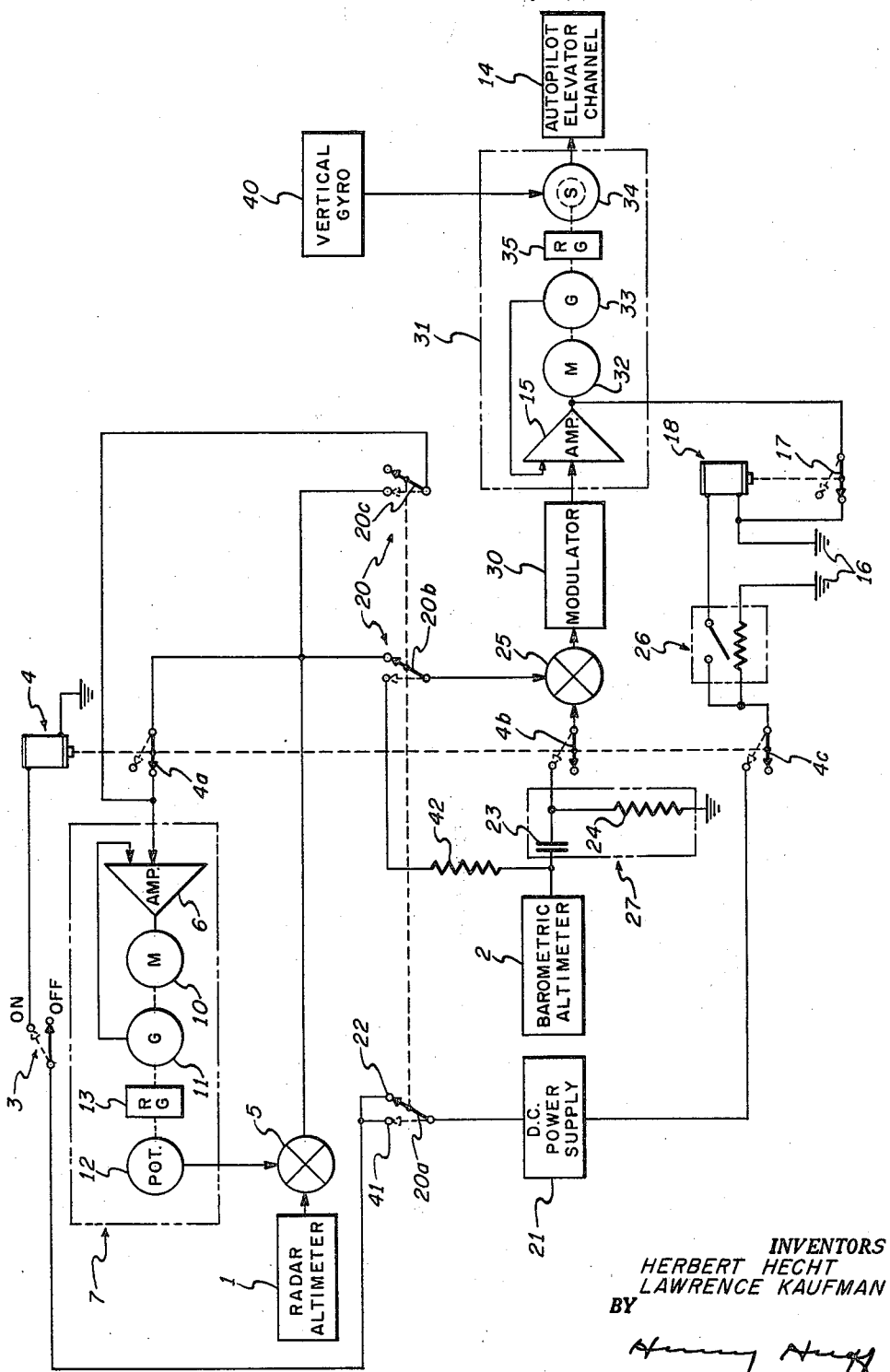

3,070,333
AIRCRAFT ALTITUDE CONTROL SYSTEM
Herbert Hecht, Scottsdale, and Lawrence Kaufman, Phoenix, Ariz., assignors to Sperry Rand Corporation, Great Neck, N.Y., a corporation of Delaware
Filed Jan. 6, 1961, Ser. No. 81,170
4 Claims. (Cl. 244—77)

This invention relates to an aircraft control system for controlling the altitude of an aircraft and particularly to means for eliminating the engage, disengage and switching transients in aircraft altitude control apparatus.

Conventional altitude controllers, particularly of the clutched type, introduce engage and disengage transients into the elevator channel of the automatic pilot control system when the altitude control system is engaged, disengaged or switched from one mode of operation to another. In conventional altitude control systems utilizing a combination of radar and barometric altimeters, it is possible for a large error to exist at the output of the barometric sensor at the time of disengagement, particularly when operating in a radar mode. This happens, for example, when a change in elevation of the terrain has taken place since engagement and, under the influence of an integrated radar altimeter signal, the aircraft has changed its altitude in order to maintain its original terrain clearance. The barometric altimeter will then provide a signal which if suddenly removed from the input of the automatic pilot system would lead to an undesirable disengage transient.

It is a primary object of the present invention to provide altitude control apparatus which is not subject to engage, disengage or mode switching transients.

It is a further object of the present invention to provide altitude control apparatus wherein the control signals emanating therefrom are smoothly introduced into and disengaged from the autopilot control system without any noticeable undesirable effect on the flight path.

The above objects are accomplished in an altitude control system which utilizes combined radar and barometric altimeters to provide signals representative of the substantially instantaneous absolute vertical displacement of the craft above the terrain and a signal representative of the rate of change of altitude of the craft respectively. The displacement and rate signals are algebraically combined and the resultant signal is integrated in an integrating device before being applied as a control signal to the elevator channel of the automatic pilot. When engaging the altitude control system, the starting of the integrator is delayed until the rate signal has decayed to zero thereby permitting the integrated control signal to be introduced slowly into the elevator channel to avoid engage transients which would otherwise occur if the control signal was introduced directly into the elevator channel. Similarly when switching from one mode of altitude control to another, the integrator is temporarily stopped to permit the new control signal to be introduced slowly into the elevator channel to avoid switching transients. To avoid disengage transients, the integrator is immediately stopped when the altitude control system is disengaged.

Referring now to the drawing, it discloses a schematic diagram of a preferred embodiment of the present invention.

The altitude control system of the present invention includes a radar altimeter 1 and a barometric altimeter 2. The radar altimeter may be of the type disclosed in the M.I.T. Radiation Laboratory Series, volume 1, on pages 143 to 147 while the barometric altimeter 2 may be of the type disclosed in U.S. Patent No. 2,446,546 issued August 10, 1948, in the name of A. W. Meston entitled "Pressure Responsive Controller Device." The radar altimeter 1 provides a signal representative of the substantially instantaneous absolute vertical displacement of the craft above the terrain while the barometric altimeter 2 provides a signal representative of the pressure altitude of the craft. Preferably, the best characteristics of each of the altimeters 1 and 2 are combined in order that the radar altimeter signal is used for long term stabilization while the barometric altimeter signal is used for short term control. The radar altimeter 1 is more accurate and is not subject to calibration for airport elevation above sea level and errors due to variations of atmospheric pressure. However, the radar altimeter signal is frequently noisy due to the nature of the signal system and also because step discontinuities may exist in the terrain such as tall buildings, trees, cliffs, etc. and it is undesirable to follow these in the course of normal aircraft flight. Therefore, smoothing of the radar altimeter signal is desired. To overcome the deficiencies of the radar altimeter signal, a rate of change of altitude signal is obtained from the barometric altimeter 2. In this respect the present invention combines the advantages of two independent measuring devices in a manner disclosed in U.S. Patent 2,841,345, issued July 1, 1958, to Halpert et al. entitled "Glide Path System With Flare-Out."

The altitude control system of the present invention may be operated in any one of three modes of operation, i.e., (1) follow-up, (2) radar, or (3) barometric.

In the follow-up mode of operation, the engage switch 3 is in the off position as shown in solid lines thereby de-energizing the relay 4 in order that its ganged contact arms 4a, 4b and 4c are in their lowermost positions as shown in solid lines. The radar altimeter 1 is connected to one input terminal of an algebraic summation device 5 while the output terminal thereof is connected through the contact arm 4a to an input terminal of a summing amplifier 6 of an electromechanical integrating device 7 which functions as a synchronizer. The integrator 7 comprises the amplifier 6 which is connected in controlling relation to a servomotor 10 which in turn drives a tachometer generator 11 and a potentiometer 12, the latter through reduction gearing 13. The tachometer generator 11 provides a rate stabilization feedback signal to another input terminal of the summing amplifier 6. The output terminal of the potentiometer 12 is connected to another input terminal of the summation device 5. Thus in the off or follow-up mode of the system, the signal from the radar altimeter 1 is applied to the amplifier 6 to drive the motor 10 which produces a signal on the potentiometer 12 representative of the altitude sensed by the radar altimeter 1. The potentiometer signal is applied in opposition to the radar altimeter signal thus maintaining that portion of the altitude control system synchronized when the switch 3 is in the off position at which time the altitude control system does not control the altitude of the craft.

In order to prevent the output signal from the summation device 5 from being effective in the autopilot elevator channel 14, the output treminal of a summing amplifier 15 is short-circuited to ground potential 16 through the contact arm 17 of a relay 18. In this mode of operation, the contact arm 17 is in its lowermost position as viewed in solid lines.

In the radar mode of operation, a mode switch 20 has its ganged contact arms 20a, 20b and 20c disposed to the right as viewed in solid lines. When the engage switch 3 is placed in its uppermost position as shown in dotted lines, the relay 4 is energized which attracts its contact arms 4a, 4b and 4c to their uppermost positions as shown in dotted lines. The relay 4 is energized by means of a D.C. power source 21 through the contact arm 20a, a contact 22 and the engage switch 3. Energizing the relay 4 results in the following: (a) with the mode switch 20 in the radar position described, the output from the summing device 5 is disconnected from the summing amplifier 6, thus the signal representative of the prevailing radar-detected altitude on the potentiometer 12 becomes the reference signal for the ensuing radar mode control phase, (b) the output terminal of the barometric altimeter 2 is connected through a rate circuit 27 comprising a series-connected capacitor 23 and a parallel resistor 24 and through the contact arm 4b to an input terminal of an algebraic summation device 25. The other input terminal of the summation device 25 in this mode of operation is connected to the output terminal of the summation device 5, and (c) the D.C. power source 21 is connected through the contact arm 4c to energize a time delay relay 26 in a manner to be explained.

The output terminal of the summation device 25 is connected to a modulator 30 for modulating the combined signal from the summation device 25. The modulated signal from the modulator 30 is then integrated by means of an electromechanical integrator 31 which includes the summing amplifier 15 provided the output terminal of the amplifier 15 is not grounded. The integrator 31 comprises the amplifier 15 which is connected to control a servomotor 32 that in turn drives a tachometer generator 33 and the rotor of a synchro control transformer 34, the latter through a reduction gearing 35. The tachometer generator 33 provides a rate stabilization feedback signal to the other input terminal of the summing amplifier 15.

A vertical gyro 40 is connected to provide a signal representative of the pitch attitude of the aircraft to the stator of the control transformer 34. The output terminals of the control transformer 34 are connected to the autopilot elevator channel 14 for maneuvering the craft in pitch to maintain a desired altitude.

In order to avoid engage transients, the integration function performed by the integrator 31 is prevented from starting until the relay 18 is energized thereby attracting the contact arm 17 to the upward position as shown in dotted lines which disconnects the output terminal of the summing amplifier 15 from the ground potential 16. The operation of the relay 18 is controlled by the time delay relay 26 and the time delay of the latter is selected in such a manner that the transient signal appearing at the output of the rate network 27 must have decayed to substantially zero prior to energizing the relay 18. This is accomplished by having the time delay of the time delay relay 26 substantially exceed the time constant of the rate circuit 27. For example, a system which operated satisfactorily utilized a 1.25 second time delay for the time delay relay 26 and a 0.1 second time constant for the rate circuit 27.

In this mode of operation for the reasons explained above, the radar altimeter 1 provides a long term stabilization signal representative of the instantaneous displacement of the craft above the terrain which is compared in the summation device 5 with the reference altitude signal from the potentiometer 12. The difference therebetween, i.e., the error signal is applied to the summation device 25 where it is compared with the short term stabilization signal which is representative of the rate of change of the altitude of the craft from the rate circuit 27 as sensed by the barometric altimeter 2. This arrangement is very desirable for maintaining the altitude of the craft during power changes, lowering of the flaps and other aerodynamic changes of this type because the use of displacement and rate terms to drive the integrator 31 then yields an altitude control which provides integral and displacement terms for controlling the craft altitude. This results in smooth altitude control in spite of aircraft aerodynamic changes which would otherwise introduce altitude flight path errors.

Another important feature of the altitude control system disclosed immediately above is the use of a rate of altitude signal which is integrated to yield a steady state term proportional to the deviation from the altitude that the craft had when the integration began. This results in the engage transient error being dependent upon the start of an integrator such as 31 which can be much more closely controlled than the exact time of mechanical engagement of a clutched-type altitude controller.

When it is desired to disengage the altitude control system of the present invention, the engage switch 3 is placed in its lower position as indicated in solid lines thereby deenergizing the relay 4 and causing its contact arms 4a, 4b and 4c to return to their lowermost positions as shown in solid lines. This causes the relay 18 to become deenergized since its coil power is derived through the contact arm 4c of the relay 4. With the output terminal of the amplifier 15 again connected to the ground potential 16 through the contact arm 17, the integrator 31 is immediately stopped thereby preventing disengage transients. Disengage transients would otherwise be prevalent because, particularly when operating in the radar mode of altitude control, it is possible for a large error to exist at the output terminal of the barometric altimeter 2 at the time of disengagement. This can happen, for example, when a change in elevation of the terrain has taken place since engagement and under the influence of the integrated signal from the radar altimeter 1, the aircraft has changed its altitude to maintain its original terrain clearance. The barometric altimeter 2 would therefore necessarily provide an error signal which if suddenly removed from the input of the autopilot elevator channel 14 would lead to undesirable disengage transients. In the present invention, this is avoided as explained above, by having the relay 18 effectively clamp the output of the integrator 31 at the same time as the barometric signal is removed from its input.

The altitude control system of the present invention is also operable in a barometric mode of operation, in which event, the mode switch 20 has its contact arms 20a, 20b and 20c in the leftward position as shown in dotted lines. In this mode of operation, only barometric altitude information is utilized to control the autopilot elevator channel 14. The radar altimeter 1 is in a follow-up mode of operation with its output connected through the summation device 5 and contact arm 20c to the input of the summing amplifier 6 and the follow-up operation is performed in a manner previously described above with respect to the follow-up mode of operation when the engage switch 3 is in the off position.

In the barometric mode of operation, a signal representative of the displacement of the craft above the terrain or from a predetermined altitude is obtained from the barometric altimeter 2 and it is applied through a resistor 42 and the contact arm 20b to an input terminal of the summation device 25. The signal representative of the rate of change of altitude of the craft is obtained from the rate circuit 27 and it is applied to the other input terminal of the summation device 25. The combined displacement and rate signal from the summation device 25 is applied to the modulator 30 and then integrated by the integrator 31 in a manner substantially as described above with respect to the radar mode of operation. To avoid engage and disengage transients in the barometric mode of operation, the integrator 31 is effectively held clamped for a predetermined time interval after the initiation of operation of the altitude control system and is immediately clamped after discontinuing this mode of operation in a manner similar to that described above with respect to the radar mode of operation. Thus, in both the radar and barometric modes of operation engage transients are minimized since the integrator 31 slowly introduces a change in the control signal from the control transformer 34 into the autopilot elevator channel 14 and since the integrator 31 is immediately clamped upon disengage there are no disengage transients in either mode of operation.

Another feature of the present invention is that the system may be switched from a radar to a barometric mode of operation or vice versa without introducing any switching transients. Assuming that the system is in the radar mode, the contact arm 20a of the mode switch 20 is touching the contact 22. When the switch 20 is thrown to the left for the barometric mode, the contact arm 20a then touches a contact 41. During the short time interval when the contact arm 20a is going from the contact 22 to the contact 41 and is not touching either of them, the relay 4 is deenergized thereby deenergizing the relay 18 and causing the output of the amplifier 15 to be connected to the ground potential 16 through the contact arm 17. When the contact arm 20a touches the contact 41, relay 4 is again energized thereby initiating the time delay cycle of the time delay relay 26. After this predetermined time delay, the relay 18 is energized thereby unclamping the integrator 31 and permitting it to slowly introduce the error signal into the autopilot elevator channel 14 by means of the control transformer 34. A similar sequence of operations takes place when the mode switch 20 is switched from a barometric to a radar mode of operation thereby preventing switching transients from occurring.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In an aircraft altitude control system, means for providing a signal representative of the vertical displacement of the craft above the terrain, means including means having a predetermined time constant for providing a signal representative of the rate of change of the altitude of said craft, algebraic summation means responsive to said displacement and rate signals for providing a combined signal representative of the algebraic summation thereof, integrating means selectively responsive to said combined signal for providing an output representative of the integral thereof, time delay means including switching means associated with said integrating means for effectively rendering said integrating means responsive to said combined signal after a predetermined time delay following engagement of said system and unresponsive to said combined signal immediately upon disengagement of said system and engage switch means for engaging and disengaging said system having at least a portion thereof connected to said time delay means.

2. In an aircraft altitude control system, radar altimeter means for providing a signal representative of the vertical deviation of the craft from a reference altitude, barometric altimeter means, rate circuit means connected to said barometric altimeter means for providing a signal representative of the rate of change of the altitude of said craft, said rate circuit means having a predetermined time constant, algebraic summation means responsive to said deviation and rate signals for providing a combined signal representative of the algebraic summation thereof, electromechanical integrating means responsive to said combined signal for providing an output representative of the integral thereof, first switching means for engaging and disengaging said altitude control system, and time delay means responsive to the operation of said first switching means including second switching means associated with said integrating means for effectively maintaining said integrating means short-circuited when said system is disengaged and for a predetermined time delay substantially greater than that of said time constant when said first switching means is initially engaged, said second switching means effectively short-circuiting said integrating means immediately upon disengaging said first switching means whereby engage and disengage transients are minimized.

3. A system of the character described with respect to claim 2 further including third switching means having at least a portion thereof associated with said first switching means for momentarily disengaging said system when switching from one mode of operation to another thereby causing said time delay cycle to be initiated.

4. A system of the character described with respect to claim 3 further including pitch attitude reference means for providing a signal representative of the pitch attitude of the aircraft, differential signal generating means having one portion thereof connected to the integrating means and the other portion thereof connected to the pitch attitude reference means for providing a control signal representative of the algebraic summation thereof, and autopilot elevator channel means responsive to said control signal for controlling the pitch attitude of the craft in accordance therewith.

References Cited in the file of this patent

UNITED STATES PATENTS

| | | |
|---|---|---|
| 2,809,340 | Bernhart | Oct. 8, 1957 |
| 2,841,345 | Halpert et al. | July 1, 1958 |
| 2,889,509 | Gorzelany et al. | June 2, 1959 |